United States Patent [19]
Gräff

[11] Patent Number: 4,521,977
[45] Date of Patent: Jun. 11, 1985

[54] METHOD AND AN APPARATUS FOR EXTRACTING GASES AND VAPORS FROM A DRYING HOPPER FILLED WITH BULK MATERIAL

[76] Inventor: Roderich W. Gräff, Kollwitzweg 19, 6100 Darmstadt-Arheilgen, Fed. Rep. of Germany

[21] Appl. No.: 529,532

[22] Filed: Sep. 6, 1983

[30] Foreign Application Priority Data

Sep. 17, 1982 [DE] Fed. Rep. of Germany ....... 3234431

[51] Int. Cl.³ .............................................. F26B 3/06
[52] U.S. Cl. .......................................... 34/32; 34/77; 34/169; 34/175
[58] Field of Search ...................... 34/32, 27, 77, 168, 34/169, 175; 432/96, 100, 101

[56] References Cited

U.S. PATENT DOCUMENTS

| | | | |
|---|---|---|---|
| 2,703,936 | 3/1955 | Hut | 34/168 |
| 3,578,297 | 5/1971 | Niems | 34/169 |
| 3,972,129 | 8/1976 | Graff | 34/32 |
| 3,986,269 | 10/1976 | Hancock | 34/30 |
| 4,337,584 | 7/1982 | Johnson | 34/77 |

Primary Examiner—Larry I. Schwartz
Assistant Examiner—David W. Westphal
Attorney, Agent, or Firm—Michael J. Striker

[57] ABSTRACT

In order to ensure, in a method for extracting gases and vapors from plastics granules and powders which are being pre-heated and dried in a drying hopper by a stream of dry air flowing into the lower region of the hopper while the outlet air is extracted from the hopper above the granules, that also that part of the plastics granules which is in the lowermost region of the drying hopper is reliably dried and warmed, the method provides that a portion of the stream of dry air is guided in a direction opposite to that of the main stream and is extracted at the lowermost point of the hopper. A drying hopper for plastics granules is suitable for carrying out the method according to the invention which has in its upper part a feeding opening for the granules and an air outlet pipe, and further has a lower outlet port for the granules and an air inlet pipe which ends inside the hopper in an air distributing opening, wherein a second air outlet pipe is mounted in the hopper near the outlet port.

11 Claims, 4 Drawing Figures

METHOD AND AN APPARATUS FOR EXTRACTING GASES AND VAPORS FROM A DRYING HOPPER FILLED WITH BULK MATERIAL

The invention relates to a method for extracting gases and vapours from plastics granules and powders (hereinafter: granules) which are preheated or dried in a hopper by a stream of warm or dry air entering at the bottom region of the hopper, the stream of outlet air being extracted from the hopper above the granules, the invention further relating to an apparatus for carrying out the method.

Bulk material, such as plastics granules, is conventionally pre-heated and dried in drying hoppers by blowing therethrough a heated air or heated dry air. To this end a fan sucks in ambient air and forces it through heating means and a pipe in the lower region of the drying hopper. The heated dry air enters through a double bottom, made in the form of a sieve, into the plastics granules, flows therethrough and heats them and removes their humidity. The humid outlet air leaves the drying hopper above the plastics granules through a port and returns to the ambient atmosphere. Instead of ambient air also heated dry air may be fed from a drier in the described manner into the drying hopper in which case the humid and cooled air is collected in the upper part of the drying hopper and is fed to the drier.

This drying method has the disadvantage that air for drying the plastics granules does not flow through the lowermost portion of the drying hopper. After the first filling of the drying hopper by plastics granules a mass of granules remains in the lowermost region upstream of a shut-off slide which is arranged in this area; the dry air does not flow through this mass of granules which is therefore neither heated nor dried. The first charge of plastics granules supplied from the drying hopper is consequently not dry and is therefore a reject.

This is particularly difficult when the drying hopper is mounted on a plastics processing machine, e.g. a screw press or an extruder, because in that case the length of the body of plastics granules which has not been reached by the warm air is even greater. Difficulties are also caused because gases and vapours from the melting zone of the plastics material leave the treatment screw under certain operating conditions and condense on the cool walls of the processing machine and of the lower part of the drying hopper in the form of condensate droplets. This happens particularly if the inlet zone for the plastics granules into the processing machine is additionally cooled by cooling channels. These condensate droplets are from time to time stripped off and carried away by the granules and cause faults in the plastics products made by the processing machine.

The aim of the invention is to create conditions which enable the plastics granules to be dried even in the lowermost parts of the drying hopper.

The method mentioned in the preamble is therefore according to the invention carried out in such a way that a portion of the dry air stream flows in a direction opposite to that of the main stream and is extracted at the lowermost part of the drying hopper. A partial stream of the dry air, deflected in the drying hopper downwardly, dries plastics granules present in the lowermost part of the drying hopper and strips off droplets of condensate which might be present on the inner surface of the drying hopper and carries them outside. If according to the invention the stream of dry air in the drying hopper is so controlled that the pressure in the whole drying hopper is higher than the ambient pressure, a partial stream of dry air is automatically produced which leaves the drying hopper at the bottom.

A drying hopper for plastics granules for carrying out a method according to the invention has in its upper part a feeding opening for the granules and an air outlet pipe, and further has a lower outlet port for the granules and an air inlet pipe which ends inside the hopper in a distributor opening, a second air outlet pipe being fixed on the hopper in the vicinity of the outlet port.

If the hopper has in the outlet port a shut-off slide for the granules, the second air outlet pipe may be fixed above said slide. The second air outlet port may be outside the hopper provided with an extracting fan for advancing the partial stream flowing downwardly in the hopper. Vapours carried away by the partial stream may be condensed in a condenser communicating outside the hopper with the second air outlet pipe and removed as a liquid.

If the dry air originates in a drier it is recommended to arrange for the second air outlet pipe to open outside the hopper into the first air outlet pipe to integrate the partial stream of dry air in the dry air circuit.

Formation of condensate droplets on the inner surface of the outlet port is avoided according to the invention in that the outlet port is surrounded by an annular space which is permeable for air but not for the granules, the second air outlet pipe opening into said space.

The invention will now be described, by way of example, with reference to the accompanying diagrammatic drawings, in which.

Figure 1:
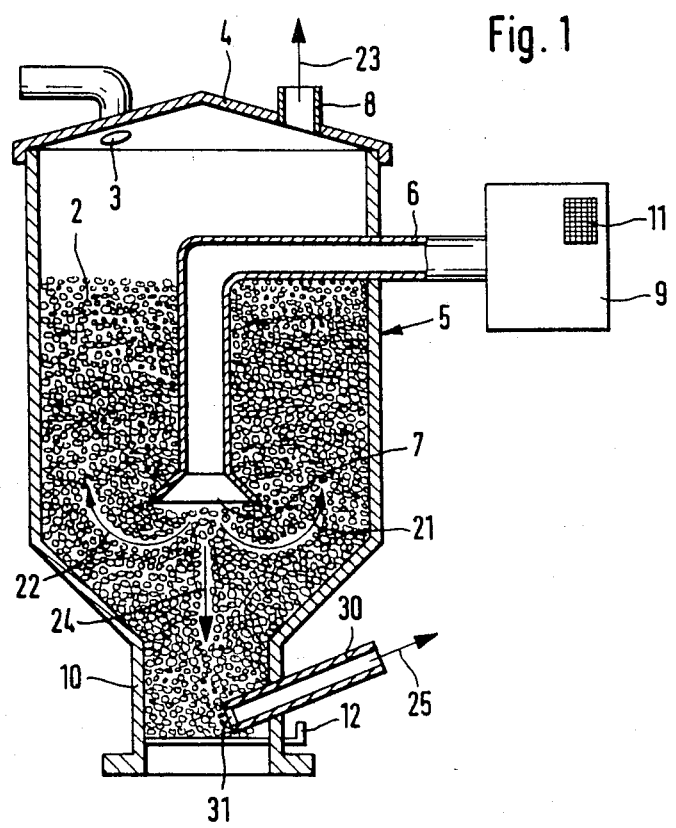
FIG. 1 is a section through a drying hopper.

The drying hopper 5 is filled with plastics granules 2 which have been brought therein through a feeding opening 3 in the roof 4 of the hopper. The humidity of the plastics granules is too high for the subsequent processing, e.g. in an extruder 50, and this humidity must be removed by dry warm air before the granules 2 enter the extruder 50. An air inlet pipe 6 projects, for this purpose, into the drying hopper 5 and ends in a flared downwardly directed distributor opening 7. In the roof 4 is provided an air outlet pipe 8. The drying hopper 5 may be closed in its bottom outlet port 10 by a shut-off slide 12.

In the basic embodiment of the invention, shown in FIG. 1, ambient air is sucked by a pump (not shown) through an inlet opening 11 into a suction stage 9, situated next to the drying hopper 5, the air is dried and pre-heated and then forced into the air inlet pipe 6. On leaving the air distributor opening 7 the warm dry air flows in a main stream, as shown by arrows 21 and 22, through the plastics granules upwardly, dried them and heats them and leaves the hopper 5 through the outlet pipe 8 as shown by the arrow 23.

So as to dry and pre-heat also the portion of the plastics granules 2 in the outlet port 10 above the slide 12, a second air outlet pipe 30 is situated in the outlet port 10. The second air outlet pipe 30 has its inlet closely above the slide 12 inside the outlet port 10 and is there provided with a protective grid 31 which prevents the plastics granules from entering the pipe 30.

In operation a partial stream is separated from the said main stream of the dry air, as shown by the arrow 24, and in the simplest case enters the outlet port 10 and leaves it through the second air outlet pipe 30 as shown by the arrow 25 because this is the shorter path to atmosphere.

Figure 2:
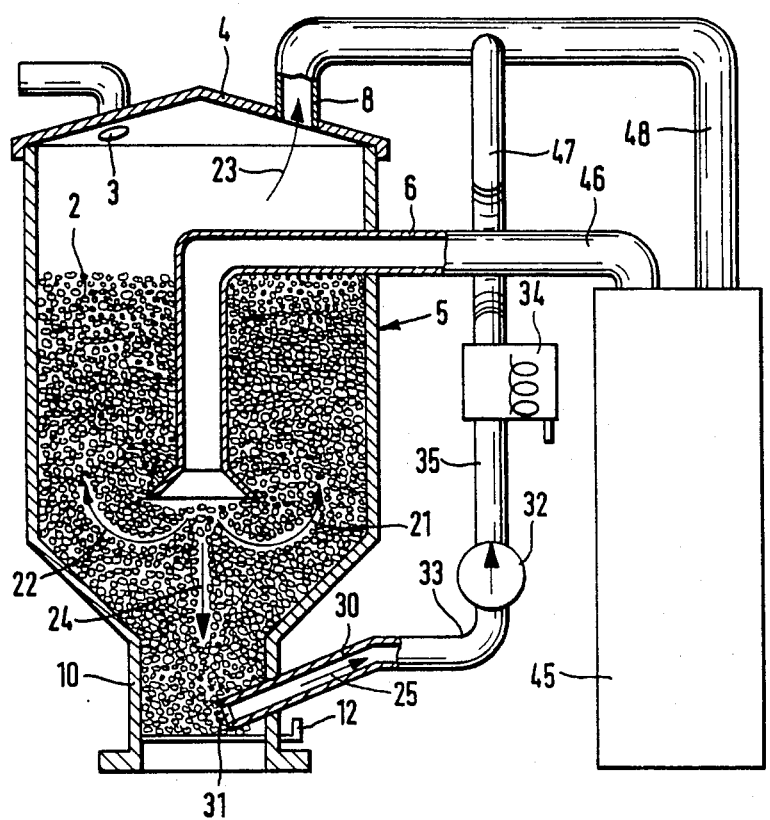
FIG. 2 is a section through a drying hopper connected to a dry air circuit.

In the embodiment of the invention shown in FIG. 2 the dry air and the humid outlet air are guided in a closed circuit through the drier 45. The drier may be of the kind described in German Pat. No. 22 14 662 application published Nov. 10, 1977. The air inlet pipe 6 communicates with the pipe 46 for dry air leading from the drier 45. The air outlet pipe 8 communicates with an air outlet pipe 48 which leads to the drier 45. The second air outlet pipe 30 communicates, via a knee 33, with the inlet of an extraction fan 32 the pressure side of which communicates via a pipe 35 with a condenser 34. The outlet pipe of the condenser 34 communicates via a further pipe 47 with the air outlet pipe 48. In other respects the drying hopper 5 shown in FIG. 2 corresponds to that shown in FIG. 1.

The partial air stream 24 branching off from the mainstream of dry air represented by the arrows 21,22, can be varied in this embodiment by the adjustment of the output of the extraction fan 32. In this way a larger partial stream of dry air may be forced at the beginning of the drying process through the second air outlet pipe 30 so that the plastics granules in the outlet port 10 are reliably dried.

Figure 3:
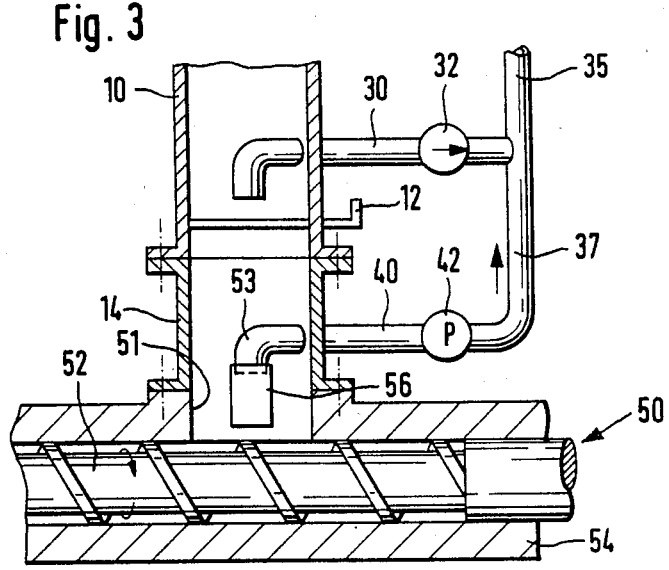
FIG. 3 is a section through a bottom part of a drying hopper mounted on a screw extruder.

When the drying hopper 5, as shown in FIG. 3, is situated on the filling hole 51 of a screw extruder 50 it can be observed, during the extrusion of the mass of plastics granules plasticised by the screw 52, that gases, such as plasticiser remnants, flow from the mass back into the outlet port 10 of the drying hopper 5. These gases condensate on the cooler inner surfaces of the outlet port 10 or the intermediate piece 14 on which is situated the drying hopper 5. These gases, which flow back from the space between the transport screw 52 and the barrel 54 which surrounds it, are sucked off by the second air outlet pipe 30 and are condensed in the condenser 34. In this way these gases and vapors are separated from the air circuit through the drier 45.

In the embodiment shown in FIG. 3 is provided a third air outlet pipe 40, which opens into the intermediate piece 14. The inlet opening is again protected by a grid (not shown) which prevents the plastics granules from entering and ends directly above the screw 52 of the extruder 50. An off-take port 53 may be provided for this purpose with an extension pipe 56 screwed thereon. The output of a further extraction fan 42 in the third air outlet pipe 40 may be so adjusted that the said gases, flowing back from the extruder 50, are received chiefly by the third air outlet pipe 40. The pressue side of the extraction fan 42 communicates by a pipe 37 with the pressure side of an extraction fan 32 and continues in the pipe 35. When the granules 2 are being pre-heated, i.e. before the start-up operation of the extruder 50 when the shut-off slide 12 is still closed, air is extracted only through the pipe 30, and after the shut-off slide 12 has been opened, after the extruder 50 has been started, the partial stream of air is extracted through the lower pipe 40.

Figure 4:
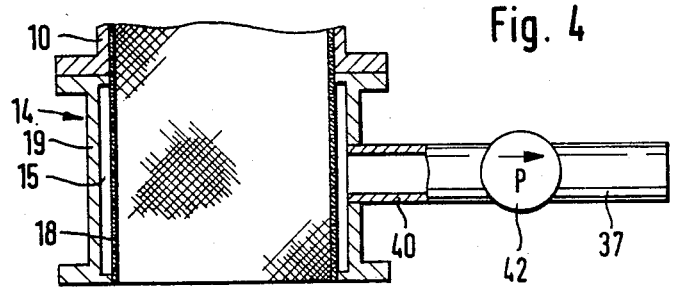
FIG. 4 is a section through an intermediate piece and the bottom part of a drying hopper mounted thereon.

The intermediate piece 14 may be made preferably as shown in FIG. 4. In the inner surface of the wall 19 of the intermediate piece 14 is made a recess which is covered by a sieve 18 which is permeable to air but not to the plastics granules. An annular space 15 is formed in this way into which opens the third air outlet pipe 40. In this form of intermediate piece 14 is reliably avoided condensation of gases and vapours flowing back from the extruder 50, while charging of the extruder 50 by dry plastics granules is not hindered.

The invention is not limited to the details of the illustrated embodiment. So, for instance, also the outlet port 10 may be inwardly provided with a gauze as has been described in connection with FIG. 4 for the intermediate piece 14.

I claim:

1. A method of drying a bulk of plastic granules, comprising the step of providing a hopper including an upper part and a bottom part; feeding the granules through a feeding opening for the granules in the upper part of the hopper; withdrawing the granules through an outlet port for the granules at the bottom part of the hopper; supplying air into the hopper through an air inlet pipe; distributing the air in the hopper by an air distributor into which the air inlet pipe opens and which extends into the interior of the hopper into the bulk of granules above the outlet port; discharging a portion of the air through a first air outlet pipe situated in the upper part of the hopper; and discharging a remaining portion of the air through a second air outlet pipe fixed in the hopper near the outlet port such that said remaining portion of the air is caused to follow a path from the air distributor through the granules in the space between the air distributor and the outlet port to cause complete drying of the granules in the bottom part of the hopper.

2. A method according to claim 1 wherein the stream of dry air is so controlled that the pressure in the hopper is higher than ambient atmospheric pressure.

3. A hopper for drying a bulk of plastic granules, said hopper comprising an upper part and a bottom part, feeding opening for the granules in the upper part of the hopper and an outlet port for the granules at the bottom part of said hopper, an air inlet pipe and an air distributor, the air inlet pipe opening into the distributor and extending into the interior of the hopper into the bulk of granules and distributor being spaced above the outlet port, an air outlet pipe situated in the upper part of the hopper for discharging a portion of the air and a second air outlet pipe fixed in the hopper near the outlet port for discharging any remaining portion of the air such that said remaining portion of the air is caused to follow a path from the air distributor through the granules in the space between the air distributor and the outlet port to cause complete drying of the granules in the bottom part of the hopper.

4. A hopper according to claim 3 wherein the outlet port has a shut-off slide for the granules above which is fixed the second air outlet pipe.

5. A hopper according to claim 3 wherein the second air outlet pipe extends into the hopper.

6. A hopper according to claim 3 wherein the second air outlet pipe communicates with an extraction fan outside the hopper.

7. A hopper according to claim 3 wherein the second air outlet pipe communicates with a condenser outside the hopper.

8. A hopper according to claim 7, wherein the second air outlet pipe opens into the first air outlet pipe outside the hopper.

9. A hopper for drying a bulk of plastic granules, said hopper comprising an upper part and a bottom part, a feeding opening for the granules in the upper part of the hopper and an outlet port for the granules at the bottom part of the hopper, an air inlet pipe and air distributor, the air inlet pipe opening into the distributor and extending into the interior of the hopper into the bulk of granules, said distributor being spaced above the outlet port, an air outlet pipe situated in the upper part of the hopper for discharging a portion of the air, an annular space adjacent the outlet port delimited by a screen permeable for air but not for the granules and a second air outlet pipe opening into the annular space for discharging any remaining portion of the air such that the remaining portion of the air is caused to follow a path from the air distributor through the granules in the space between the air distributor and the outlet port to cause complete drying of the granules in the bottom part of the hopper.

10. A hopper for drying with a bulk of plastic granules, said hopper comprising an upper part and a bottom part, a feeding opening for the granules in the upper part, an outlet port for the granules at the bottom part of the hopper, an air inlet pipe and a distributor, the air inlet pipe opening into the distributor and extending into the interior of the hopper into the bulk of granules, said distributor being spaced above the outlet port, an air outlet pipe situated in the upper part of the hopper for discharging a portion of the air, a second air outlet pipe extending into the hopper near the outlet port for discharging a first part of any remaining portion of the air such that said remaining portion of the air is caused to follow a path from the air distributor through the granules in the space between the air distributor and the outlet port to cause complete drying of the granules in the bottom part of the hopper, a shut-off slide valve for the granules fixed to the outlet port below the second outlet pipe for controlling discharge of the granules from the hopper, and a third outlet pipe fixed to the hopper below the shut-off valve for discharge of a second part of the remaining portion of the air.

11. An assembly comprising a hopper for drying a bulk of plastic material, said hopper comprising an upper part and a bottom part, a feeding opening for the granules in the upper part of the hopper, an outlet port for the granules at the bottom part of the hopper, a shut-off slide valve fixed to the outlet port to control discharging of the granules, an air inlet pipe and an air distributor, the air inlet pipe opening into the distributor and extending into the interior of the hopper into the bulk of granules, said distributor being spaced above the outlet port situated in the upper part of the hopper for discharging a portion of the air, and a second air outlet pipe extending into the hopper near the outlet port and above the shut-off slide valve for discharging a first part of any remaining portion of the air such that said remaining portion of the air is caused to follow a path from the air distributor through the granules in the space between the air distributor and the outlet port to cause complete drying in the bottom part of the hopper; the assembly further comprising a plastic granules processing machine which is provided with a feeding hole for feeding in the granules, wherein the outlet port is extended by an intermediate piece beyond the shut-off slide valve of the hopper to connect the outlet port of the hopper to the feeding hole of the processing machine, and a third air outlet pipe being provided which extends through the intermediate piece into the feeding hole to discharge a second part of the remaining portion of the air.

* * * * *